US 9,945,986 B2

(12) United States Patent
Lim et al.

(10) Patent No.: US 9,945,986 B2
(45) Date of Patent: *Apr. 17, 2018

(54) ACRYLIC OPTICAL FILM, AND POLARIZING PLATE COMPRISING SAME

(71) Applicant: LG CHEM, LTD., Seoul (KR)

(72) Inventors: Yirang Lim, Daejeon (KR); Hwa Sub Shim, Daejeon (KR); Kyoung Won Kim, Daejeon (KR); Sung Hyun Jeon, Daejeon (KR); Jun Wuk Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 74 days.

This patent is subject to a terminal disclaimer.

(21) Appl. No.: 15/024,731

(22) PCT Filed: Sep. 23, 2014

(86) PCT No.: PCT/KR2014/008799
§ 371 (c)(1),
(2) Date: Mar. 24, 2016

(87) PCT Pub. No.: WO2015/046844
PCT Pub. Date: Apr. 2, 2015

(65) Prior Publication Data
US 2016/0245958 A1    Aug. 25, 2016

(30) Foreign Application Priority Data

Sep. 30, 2013 (KR) .................. 10-2013-0116998
Sep. 18, 2014 (KR) .................. 10-2014-0124602

(51) Int. Cl.
| | |
|---|---|
| *C08J 7/04* | (2006.01) |
| *G02B 1/14* | (2015.01) |
| *G02B 5/30* | (2006.01) |
| *C08J 7/12* | (2006.01) |
| *C08G 18/62* | (2006.01) |
| *C08G 18/44* | (2006.01) |
| *C08L 75/04* | (2006.01) |
| *C08J 5/04* | (2006.01) |
| *C08L 67/00* | (2006.01) |
| *B32B 7/12* | (2006.01) |
| *B32B 27/36* | (2006.01) |
| *B32B 27/40* | (2006.01) |
| *C08L 33/12* | (2006.01) |

(52) U.S. Cl.
CPC .................. *G02B 1/14* (2015.01); *B32B 7/12* (2013.01); *B32B 27/36* (2013.01); *B32B 27/40* (2013.01); *C08G 18/44* (2013.01); *C08G 18/6229* (2013.01); *C08J 5/04* (2013.01); *C08J 7/04* (2013.01); *C08J 7/047* (2013.01); *C08L 33/12* (2013.01); *C08L 67/00* (2013.01); *C08L 75/04* (2013.01); *G02B 5/30* (2013.01); *G02B 5/305* (2013.01); *G02B 5/3033* (2013.01); *B32B 2250/02* (2013.01); *B32B 2255/26* (2013.01); *B32B 2307/42* (2013.01); *B32B 2551/00* (2013.01); *C08J 2333/00* (2013.01); *C08J 2433/00* (2013.01); *C08J 2467/00* (2013.01); *C08J 2475/04* (2013.01)

(58) Field of Classification Search
CPC ............ B32B 2250/03; B32B 2255/26; B32B 2307/42; B32B 2551/00; B32B 27/30; B32B 27/36; B32B 27/40; B32B 7/12; C08G 18/44; C08G 18/6229; C08L 33/12; C08L 67/00; C08L 75/04; G02B 1/14; G02B 5/30; G02B 5/3033; G02B 5/305; C08J 2333/00; C08J 2433/00; C08J 2467/00; C08J 2475/04; C08J 5/04; C08J 7/04; C08J 7/047
USPC ................................... 428/1.31, 1.33, 424.2
See application file for complete search history.

(56) References Cited

U.S. PATENT DOCUMENTS

| | | | | |
|---|---|---|---|---|
| 4,981,885 A | * | 1/1991 | Engel .................. | C09D 151/003 523/409 |
| 2003/0216515 A1 | * | 11/2003 | Swarup .............. | C08G 18/0823 525/123 |
| 2009/0135335 A1 | | 5/2009 | Lee et al. | |
| 2010/0239868 A1 | * | 9/2010 | Takada .................... | B32B 27/08 428/423.1 |
| 2011/0039107 A1 | | 2/2011 | Buchholz et al. | |
| 2011/0111130 A1 | * | 5/2011 | Hickl ..................... | B05D 7/544 427/388.2 |
| 2011/0157525 A1 | | 6/2011 | Yamasaki et al. | |
| 2013/0279003 A1 | | 10/2013 | Seo et al. | |
| 2014/0017418 A1 | * | 1/2014 | Shim ................. | G02F 1/133528 428/1.31 |
| 2014/0037942 A1 | | 2/2014 | Park et al. | |
| 2015/0247013 A1 | * | 9/2015 | Koyama .................. | C08J 7/047 428/220 |

FOREIGN PATENT DOCUMENTS

| | | |
|---|---|---|
| EP | 0951991 A1 | 10/1997 |
| EP | 2816085 A1 | 12/2014 |
| JP | 10-166517 A | 6/1998 |
| JP | 2007-078786 A | 3/2007 |
| JP | 2010-055062 A | 3/2010 |
| JP | 2010-181500 | 8/2010 |
| JP | 2011-0504957 A | 2/2011 |
| JP | 2012-032768 A | 2/2012 |
| JP | 2012-063773 A | 3/2012 |
| KR | 10-2009-0054331 A | 5/2009 |

(Continued)

*Primary Examiner* — Thao T Tran
(74) *Attorney, Agent, or Firm* — Dentons US LLP

(57) ABSTRACT

The present invention relates to an acryl-based film that includes a first primer layer including a water-dispersible polyurethane resin formed on one surface, and a second primer layer including at least one or more types of a water-dispersible polyester-based resin, a water-dispersible acryl-based resin and a water-dispersible polyester acryl-based resin formed on the opposite surface, and a polarizing plate including the same.

13 Claims, No Drawings

(56) References Cited

FOREIGN PATENT DOCUMENTS

| KR | 10-2011-0038680 A | 4/2011 |
|----|-------------------|--------|
| KR | 10-2012-0030937 A | 3/2012 |
| KR | 10-2013-0040724 A | 4/2013 |
| TW | 201229162 A | 7/2012 |
| WO | 99-25553 A1 | 5/1999 |
| WO | 2014-178517 A1 | 11/2014 |

* cited by examiner

ACRYLIC OPTICAL FILM, AND POLARIZING PLATE COMPRISING SAME

This application is a National Stage of International Application No. PCT/KR2014/008799, filed on Sep. 23, 2014, which claims the benefit of and priority to Korean Application Nos. 10-2013-0116998, filed Sep. 30, 2013, and 10-2014-0124602 filed Sep. 18, 2014, all of which are hereby incorporated by reference in their entirety.

TECHNICAL FIELD

The present invention relates to an acryl-based optical film, and a polarizing plate and display device comprising the same, and in particular, to an acryl-based optical film including a urethane-based primer layer formed on one surface and a non-urethane-based primer layer formed on the other surface thereby having excellent adhesive strength with an adhesive layer and a surface coating layer, and also having excellent anti-blocking and slip properties, and a polarizing plate and display device comprising the same.

BACKGROUND ART

Polarizing plates having a structure in which a protective film is laminated on one or both surfaces of a polarizer formed with a polyvinyl alcohol (hereinafter, referred to as 'PVA')-based resin dyed with dichroic dye or iodine using an adhesive have been commonly used. Triacetyl cellulose (TAC)-based films have been normally used as a polarizing plate protective film in the art, however, such TAC films have a problem of being readily deformed in high temperature and high humidity environments. Accordingly, protective films made of various materials capable of replacing TAC films have been recently developed, and for example, a method of using polyethylene terephthalate (PET), a cycloolefin polymer (COP), and an acryl-based film either alone or as a mixture thereof has been proposed. Among these, an acryl-based film has attracted particular attention with advantages such as excellent optical properties and durability, and being inexpensive.

However, an acryl-based film has higher surface friction compared to films made of other materials, and there are problems in that adhesive strength with an adhesive layer is reduced, workability becomes inferior due to a poor slip property when winding, and a blocking phenomenon, in which film surfaces adhere together, occurs after winding. In order to solve such problems, methods of filling the film with a small amount of rubber particles or inorganic particles when preparing an acryl-based film have been proposed, however, in the case of an acryl-based film prepared using such a method, problems such as the reduction of film transparency due to an increase in haze, and the reduction of film orientation property occur, therefore, an acryl-based film has not been suitable as an optical film.

In addition, a polarizer protective film may generally include various functional coating layers such as an anti-reflection layer and a hard coating layer on one surface opposite to the polarizer-attached surface for anti-reflection, durability improvement, scratch prevention and visibility improvement, and such functional coating layers are generally formed using a method of applying a coating composition including a base resin, a solvent, additives and the like on a protective film, and then curing the result. However, in the case of an acryl-based film, problems such that a functional coating layer is not favorably coated due to poor solvent resistance, or a film surface is melted and damaged when a functional coating layer is formed may occur.

In view of the above, methods of carrying out surface treatment such as plasma treatment and corona treatment on the surface of a protective film, or forming a primer layer have been proposed, however, methods that have been proposed so far have not been able to sufficiently secure adhesive strength between a functional coating layer and a protective film, particularly an acryl-based protective film. For example, urethane-based primers that have been proposed in the art as a primer layer for a protective film have low water resistance and solvent resistance, therefore, there have been problems such that adhesive strength is reduced due to moisture penetration when the primer layer is stored for a long period of time under a high humidity condition, or, when a coating composition including an organic solvent is applied on a primer layer, the primer layer is expanded due to the solvent included in the coating composition or the primer layer is desorbed from a protective film since the primer layer is dissolved in the coating composition.

DISCLOSURE

Technical Problem

In view of the above, an object of the present invention is to provide an acryl-based optical film having a urethane-based primer layer formed on one surface and a non-urethane-based primer layer formed on the opposite surface thereby having excellent adhesive strength with an adhesive layer and a surface coating layer, and also having excellent anti-blocking and slip properties, and a polarizing plate and display device including the same.

Technical Solution

According to one embodiment of the present invention, there is provided an acryl-based film including a first primer layer that includes a water-dispersible polyurethane resin formed on one surface, and a second primer layer that includes at least one or more types of a water-dispersible polyester-based resin, a water-dispersible acryl-based resin and a water-dispersible polyester acryl-based resin formed on the opposite surface.

Herein, at least one or more of the first primer layer and the second primer layer may include water-dispersible fine particles, and the content of the water-dispersible fine particles may be approximately 0 parts by weight to 10 parts by weight with respect to the total content of the first primer composition, and approximately 0 parts by weight to 20 parts by weight with respect to the total content of the second primer composition.

Meanwhile, the water-dispersible polyurethane resin is preferably carbonate-based polyurethane or ester-based polyurethane.

Next, the water-dispersible polyester-based resin preferably includes a repeating unit represented by the following [Chemical Formula 1].

[Chemical Formula 1]

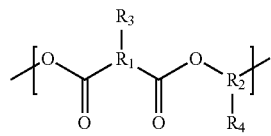

In [Chemical Formula 1], $R_1$ and $R_2$ are each independently, hydrogen, substituted or unsubstituted $C_{1-20}$ alkyl, substituted or unsubstituted $C_{6-20}$ aryl or substituted or unsubstituted $C_{5-20}$ cycloalkyl, and $R_3$ and $R_4$ are each independently hydrogen, substituted or unsubstituted $C_{1-20}$ alkyl, substituted or unsubstituted $C_{6-20}$ aryl, substituted or unsubstituted $C_{5-20}$ cycloalkyl, a carboxyl group, a hydroxyl group or a sulfonate group, and at least one of $R_3$ and $R_4$ is a carboxyl group, a hydroxyl group or a sulfonate group.

Meanwhile, the water-dispersible acryl-based resin preferably includes a repeating unit represented by the following [Chemical Formula 3].

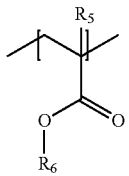

[Chemical Formula 3]

In [Chemical Formula 3], $R_5$ is hydrogen, or substituted or unsubstituted $C_{1-20}$ alkyl, and preferably hydrogen or methyl, and $R_6$ is hydrogen, substituted or unsubstituted $C_{1-20}$ alkyl, an epoxy group or a hydroxyl group.

Meanwhile, the water-dispersible polyester acryl-based resin may be a polyester acryl-based resin including both an ester-based repeating unit represented by [Chemical Formula 1] and an acryl-based repeating unit represented by [Chemical Formula 3]. Herein, the polyester acryl-based resin is preferably prepared by reacting polyester glycol and an acryl-based monomer in a weight ratio of 1:9 to 9:1.

Meanwhile, the acryl-based film of the present invention may further include a functional coating layer on the second primer layer.

According to another embodiment of the present invention, there is provided a polarizing plate including a polarizer; the acryl-based film of the present invention disposed on at least one surface of the polarizer; and an adhesive layer provided between the polarizer and the acryl-based film, wherein a first primer layer of the acryl-based film is disposed on the surface adjacent the adhesive layer.

Advantageous Effects

In an acryl-based film of the present invention, a first primer layer including a polyurethane resin having excellent adhesive strength with an adhesive layer is formed on one surface, and a second primer layer including a polyester- or acryl-based resin having high solvent resistance and having excellent adhesive strength with a composition for forming a functional coating layer is formed on the other surface, therefore, adhesive strength between the adhesive layer and the functional coating layer is very superior.

In addition, an acryl-based film of the present invention also has excellent anti-blocking and slip properties since surface friction at the film surface is reduced due to the presence of a primer layer, and therefore, blocking does not occur when and after winding, and workability is excellent.

MODE FOR DISCLOSURE

Hereinafter, preferred embodiments of the present invention will be described. However, embodiments of the present invention may be modified to various other forms, and the scope of the present invention is not limited to the embodiments described below. In addition, embodiments of the present invention are provided in order to more completely describe the present invention for those having average knowledge in the art.

As a result of extensive studies for developing an acryl-based film having excellent adhesive strength with an adhesive layer and a surface coating layer, and having excellent anti-blocking and slip properties, the inventors of the present invention have found that such a goal may be accomplished by forming a urethane-based primer layer on one surface of an acrylic film, and forming a non-urethane-based primer layer on the opposite surface, and completed the present invention.

More specifically, an acryl-based film of the present invention includes a first primer layer including a water-dispersible polyurethane resin formed on one surface, and a second primer layer including at least one or more types of a water-dispersible polyester-based resin, a water-dispersible acryl-based resin and a water-dispersible polyester acryl-based resin formed on the other surface.

Herein, the first primer layer is for enhancing adhesive strength between an adhesive layer and the acryl-based film, and is formed by a first primer composition including a polyurethane resin. The first primer composition includes a polyurethane resin and water, and may further include water-dispersible fine particles as necessary.

More specifically, the first primer composition of the present invention may include the polyurethane resin in 1 parts by weight to 30 parts by weight, the water-dispersible fine particles in 0 parts by weight to 10 parts by weight, and water in the remaining content, with respect to the total content of the first primer composition, and preferably include the polyurethane resin in 1 parts by weight to 30 parts by weight, the water-dispersible fine particles in 0.1 parts by weight to 5 parts by weight, and water in the remaining content, however, the content is not limited thereto. Herein, the 'remaining content' means a content remaining after excluding the content of the solid components from the total content of the whole primer composition.

Meanwhile, the polyurethane resin means a resin including a urethane repeating unit formed by the reaction of an isocyanate and a polyol in the main chain, and herein, compounds having two or more NCO groups may be used as the isocyanate group without limit, and as the polyol, compounds including two or more hydroxyl groups, for example, a polyester-based polyol, a polycarbonate-based polyol, a polyether polyol and the like, may be used without limit.

More specifically, as the isocyanate component, for example, either one or a combination of two or more types from the group consisting of toluene diisocyanate (TDI), 4,4-diphenylmethan diisocyanate (MDI), 1,5-naphthalene diisocyanate (NDI), tolidine diisocyanate (TODI), hexamethylene diisocyanate (HMDI), isoprone diisocyanate (IPDI), p-phenylene diisocyanate, trans-cyclohexane, 1,4-diisocyanate and xylene diisocyanate (XDI) may be used.

Meanwhile, the polyester-based polyol may be obtained by reacting a polybasic acid component and a polyol component, and herein, examples of the polybasic acid component may include aromatic dicarboxylic acids such as ortho-phthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid and tetrahydrophthalic acid; aliphatic dicarboxylic acids such as oxalic acid, succinic acid, malonic acid, glutaric acid, adipic acid, pimelic acid, suberic acid, azelaic acid, sebacic acid, linoleic acid, maleic acid, fumaric acid, mesaconic acid and itaconic acid; alicyclic dicarboxylic acids such as hexahydrophthalic acid, tetrahydrophthalic acid, 1,3-cyclohexane dicarboxylic acid and 1,4-cyclohexane dicarboxylic acid; or reactive derivatives such as acid anhydrides, alkyl esters and acid halides thereof. These may be used either alone or as a combination of two or more types.

Meanwhile, the polycarbonate-based polyol may be obtained by reacting a compound having a carbonate group and a polyol component, and herein, examples of the compound having a carbonate group may include diphenyl carbonate, dialkyl carbonate, alkylene carbonate and the like.

In addition, the polyether polyol may be obtained by adding alkylene oxide to the polyol component by ring opening polymerization.

Meanwhile, the polyol component is not particularly limited as long as the component has two or more hydroxyl groups in the molecule, and any suitable polyol may be employed. Examples of the polyol may preferably include at least one type selected from the group consisting of ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose, and sorbitol. Among these, at least one type selected from the group consisting of polytetramethylene glycol (PTMG), polypropylene glycol (PPG) and polyethylene glycol (PEG) is particularly preferable.

Furthermore, the polyurethane-based resin may further include other polyols or chain extenders within a range of not damaging the physical properties of the present invention.

Herein, examples of the other polyols may include a polyol having three or more hydroxyl groups such as sorbitol, glycerin, trimethylolethane, trimethylolpropane and pentaerythritol, and the like.

In addition, examples of the other chain extenders may include glycols such as ethylene glycol, diethylene glycol, triethylene glycol, 1,3-propanediol, 1,3-butanediol, 1,4-butanediol, neopentyl glycol, pentanediol, 1,6-hexanediol and propylene glycol, and the like.

Meanwhile, the polyurethane resin may be a polyacrylic urethane resin including an acryl-based unit together with a urethane unit by additionally copolymerizing an acryl-based monomer component as necessary. The polyacrylic urethane resin has an advantage of having excellent solvent resistance and transparency when compared to a polyurethane-based resin that does not include an acryl-based unit.

Examples of the acryl-based monomer capable of being used in the present invention may include one or more types selected from the group consisting of alkyl (meth)acrylate, alkyl acrylate, epoxy (meth)acrylate, hydroxyalkyl acrylate, alkyl (meth)acrylic acid including a carbonyl group, alkyl acrylic acid, and acrylate including a sulfonate. Herein, examples of the acrylate including a sulfonate may include acrylate including sodium 2-methyl-2-propene-1-sulfonate, acrylate including sodium aryl sulfonate, acrylate including 2-propene-1-sulfonate, and the like.

In addition, the polyurethane resin may copolymerize other monomers in addition to the acrylic monomer component. Herein, as the other monomers, unsaturated nitriles such as (meth)acrylonitrile; unsaturated amides such as (meth)acrylamide; olefins such as ethylene and propylene; a β-unsaturated aliphatic monomer such as halogenated vinyl chloride and vinylidene chloride; a β-unsaturated aromatic monomer such as styrene and methylstyrene, and the like, may be used, and these may be used either alone or as a combination of two or more types.

Meanwhile, the polyurethane-based resin may further include a neutralizing agent as necessary. When a neutralizing agent is included, stability of a urethane resin in water may be improved. As examples of the neutralizing agent, ammonia, N-methylmorpholine, triethylamine, dimethylethanolamine, methyldiethanolamine, triethanolalkyne, morpholine, tripropylamine, ethanolamine, triisopropanolamine and the like may be used either alone or as a combination of two or more types.

In addition, the polyurethane-based resin is preferably prepared in an organic solvent inert to the isocyanate and having compatibility for water. As the organic solvent, an ester-based solvent such as ethyl acetate and ethyl cellosolve acetate; a ketone-based solvent such as acetone, methylethyl ketone and methylisobutyl ketone; an ether-based solvent such as dioxane and tetrahydrofuran may be used either alone or as a combination of two or more types.

Meanwhile, the polyurethane-based resin capable of being used in the present invention may be prepared using any suitable method known in the art. Specifically, a one-shot method reacting each of the components at once, and a multi-stage method reacting each of the components in stages may be used. In addition, any suitable urethane reaction catalyst may be used when preparing the polyurethane-based resin.

Meanwhile, in the present invention, the polyurethane-based resin preferably includes a functional group such as a carboxyl group, a sulfonate group, a hydroxyl group or a tertiary amine group. When the polyurethane-based resin includes the functional groups, adhesive strength for an adhesive layer and water dispersibility may be enhanced. Meanwhile, the polyurethane-based resin including such a functional group may be prepared using compounds including the functional group as a polyol and/or an isocyanate, or using a method of adding a chain extender including the functional groups when a polyol and an isocyanate are reacted. For example, a polyurethane-based resin including a carboxyl group or a tertiary amine group may be prepared by adding and reacting a chain extender including a free a carboxyl group or a free amine group when a polyester polyol and an isocyanate are reacted. Herein, examples of the chain extender having a free carboxyl group may include dihydroxy carboxylic acid, dihydroxy succinic acid and the like. Examples of the dihydroxy carboxylic acid may be dialkylol alkanoic acid including dimethylol alkanoic acid such as dimethylol acetic acid, dimethylol butanoic acid, dimethylol propionic acid, dimethylol butyric acid and dimethylol pentanoic acid. These may use either alone or as a combination of two or more types. Meanwhile, examples of the chain extender having a free amine group may include aliphatic diamines such as ethylenediamine, propylenediamine, hexamethylenediamine, 1,4-butanediamine and aminoethylethanolamine; alicyclic diamines such as isophorone diamine and 4,4'-dicyclohexylmethanediamine; and aromatic diamines such as xylylenediamine and tolylenediamine, and the like. These may be used either alone or as a combination of two or more types.

Meanwhile, in terms of dispersibility and transparency, the polyurethane resin is particularly preferably, but not limited to, a carbonate-based polyurethane resin using a polycarbonate-based polyol as a reactant or an ester-based polyurethane resin using a polyester-based polyol as a reactant.

Meanwhile, the weight average molecular weight of the polyurethane-based resin preferably ranges from 10,000 to 1,000,000. When the weight average molecular weight of the polyurethane-based resin satisfies the above range, it is effective in that sufficient adhesive strength may be obtained, and water dispersibility is excellent.

Next, the second primer layer is for enhancing adhesive strength with a functional coating layer, and formed by a second primer composition including one or more types of water-dispersible resins selected from the group consisting of a water-dispersible polyester resin, a water-dispersible acrylic resin and a water-dispersible polyester acryl-based resin.

Herein, the second primer composition includes one or more types of water-dispersible resins selected from the group consisting of a water-dispersible polyester resin, a water-dispersible acrylic resin and a water-dispersible polyester acryl-based resin, and water, and may further include water-dispersible fine particles as necessary.

More specifically, the second primer composition may include one or more types of water-dispersible resins selected from the group consisting of a water-dispersible polyester resin, a water-dispersible acrylic resin and a water-dispersible polyester acryl-based resin in 1 parts by weight to 50 parts by weight, water-dispersible fine particles in 0 parts by weight to 20 parts by weight, and water in the remaining content, and more preferably, may include one or more types of water-dispersible resins selected from the group consisting of a water-dispersible polyester resin, a water-dispersible acrylic resin and a water-dispersible polyester acryl-based resin in 5 parts by weight to 30 parts by weight, water-dispersible fine particles in greater than 0 and less than or equal to 10 parts by weight, and water in the remaining content. Herein, the 'remaining content' means a content remaining after excluding the content of the solid components from the total content of the whole primer composition.

Meanwhile, the water-dispersible polyester resin means a resin including an ester group formed by the reaction of carboxylic acid and alcohol in the main chain, and may be preferably a water-dispersible polyester resin, and more preferably may include polyester glycol formed by the reaction of a polybasic acid and a polyol.

Herein, examples of the polybasic acid component may include aromatic dicarboxylic acids such as ortho-phthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid and tetrahydrophthalic acid; aliphatic dicarboxylic acids such as oxalic acid, succinic acid, malonic acid, glutaric acid, adipic acid, pimelic acid, suberic acid, azelaic acid, sebacic acid, linoleic acid, maleic acid, fumaric acid, mesaconic acid and itaconic acid; alicyclic dicarboxylic acids such as hexahydrophthalic acid, tetrahydrophthalic acid, 1,3-cyclohexane dicarboxylic acid and 1,4-cyclohexane dicarboxylic acid; or reactive derivatives such as acid anhydrides, alkyl esters and acid halides thereof. These may be used either alone or as a combination of two or more types. Among these, terephthalic acid, isophthalic acid, succinic acid and the like are particularly preferable. In addition, using isophthalic acid substituted with a sulfonate as the basic acid is particularly preferable in terms of water dispersibility.

Meanwhile, the polyol is not particularly limited as long as it has two or more hydroxyl groups in the molecule, and any suitable polyol may be employed. Examples of the polyol is preferably at least one type selected from the group consisting of ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose, and sorbitol. In addition, using carboxylic group-containing dimethylol alkanoic acid, dimethylol acetic acid, dimethylol propionic acid, dimethylol butanoic acid and the like either alone or as a combination of two or more types as the polyol is particularly preferable in terms of water dispersibility.

Meanwhile, the polyester glycol is formed by reacting the polybasic acid and the polyol in a molar ratio of 2.5:1 to 1:2.5, preferably in a molar ratio of 2.3:1 to 1:2.3, and more preferably in a molar ratio of 2:1 to 1:2. When the molar ratio of the polybasic acid and the polyol reaction is outside the above range, a smell is caused by unreacted monomers or coating defects may occur.

As the method for preparing the polyester resin, any suitable method known in the art may be employed. For example, the polyester resin of the present invention may be prepared by polycondensation after an esterification reaction of a polybasic acid and a polyol, or polycondensation after an esterification reaction of a polybasic acid anhydride and a polyol, and more specifically, these methods may be carried out by including (1) a raw material mixing step obtaining a raw material mixture by mixing polymerization raw materials for polyester polymerization, (2) an esterification reaction step esterifying the raw material mixture, and (3) a polycondensation step obtaining polyester by polycondensing the esterified raw material mixture.

Meanwhile, the polyester resin used in the present invention and prepared using the method described above may include a repeating unit represented by the following [Chemical Formula 1].

[Chemical Formula 1]

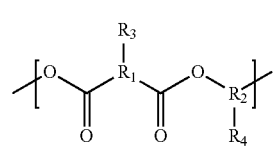

In [Chemical Formula 1], $R_1$ and $R_2$ are each independently hydrogen, substituted or unsubstituted $C_{1-20}$ alkyl, substituted or unsubstituted $C_{6-20}$ aryl, or substituted or unsubstituted $C_{5-20}$ cycloalkyl, $R_3$ and $R_4$ are each independently hydrogen, substituted or unsubstituted $C_{1-20}$ alkyl, substituted or unsubstituted $C_{6-20}$ aryl, substituted or unsubstituted $C_{5-20}$ cycloalkyl, a carboxyl group, a hydroxyl group or a sulfonate group, and at least one of $R_3$ and $R_4$ is a carboxyl group, a hydroxyl group or a sulfonate group. Among these, $R_3$ or $R_4$ is particularly preferably a carboxyl group or a sulfonate group.

More preferably, the polyester resin used in the present invention may include a repeating unit represented by the following [Chemical Formula 2].

[Chemical Formula 2]

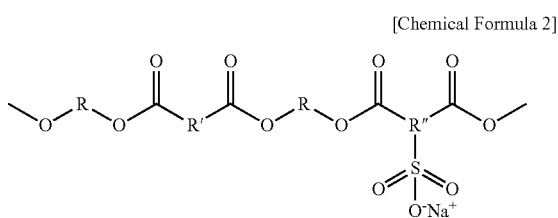

In [Chemical Formula 2], R, R' and R" are each independently hydrogen, substituted or unsubstituted $C_{1-20}$ alkyl, substituted or unsubstituted $C_{6-20}$ aryl, substituted or unsubstituted $C_{5-20}$ cycloalkyl, and the like.

Meanwhile, the polyester resin may further include additional components in addition to the components described above within a range of not damaging the physical properties of the present invention.

Next, the acryl-based resin means a resin including a repeating unit derived from a (meth)acrylate unit, and the acryl-based resin of the present invention may be obtained by, for example, copolymerizing a sulfonic acid group-including acrylic monomer or vinyl monomer. These may be used either alone or as a combination of two or more types. Other monomers may also be copolymerized in addition to the vinyl monomer component. Herein, as the other monomers, unsaturated nitriles such as (meth)acrylonitrile; unsaturated amides such as (meth)acrylamide; a β-unsaturated aliphatic monomer such as halogenated vinyl chloride or vinylidene chloride; a β-unsaturated aromatic monomer such as styrene or methylstyrene, and the like, may be used. These may be used either alone or as a combination of two or more types.

For example, the acrylic resin may include a repeating unit represented by the following [Chemical Formula 3].

[Chemical Formula 3]

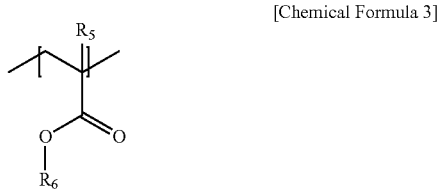

In [Chemical Formula 3], $R_5$ is hydrogen, or substituted or unsubstituted $C_{1-20}$ alkyl, and preferably hydrogen or methyl, and $R_6$ is hydrogen, substituted or unsubstituted $C_{1-20}$ alkyl, an epoxy group or a hydroxyl group.

Next, the water-dispersible polyester acryl-based resin is a resin including an ester-based repeating unit and an acryl-based repeating unit, and may be prepared by copolymerizing an acryl-based monomer component to polyester glycol. More specifically, the water-dispersible polyester acryl-based resin of the present invention may include an ester-based repeating unit represented by [Chemical Formula 1] and an acryl-based repeating unit represented by [Chemical Formula 3].

Herein, the polyester glycol is the same as that described in the polyester resin. Meanwhile, examples of the acryl-based monomer may include one or more types selected from the group consisting of alkyl (meth)acrylate, alkyl acrylate, epoxy(meth)acrylate, hydroxyalkyl acrylate, alkyl (meth)acrylic acid including a carbonyl group, alkyl acrylic acid, and acrylate including a sulfonate. Herein, examples of the acrylate including a sulfonate may include acrylate including sodium 2-methyl-2-propene-1-sulfonate, acrylate including sodium aryl sulfonate, acrylate including 2-propene-1-sulfonate, and the like. Meanwhile, among the acryl-based monomers, when an epoxy acrylate monomer containing an epoxy group is copolymerized to a polyester resin, the epoxy ring is dissociated at a high temperature leading to the cross-linkage between the epoxy rings due to an addition polymerization reaction, and there is an advantage in that high temperature stability is improved by enhancing high temperature durability of the polyester main chain.

In addition, the polyester acryl-based resin may be prepared by copolymerizing other monomers in addition to the acrylic monomer component as necessary. Herein, as the other monomers, unsaturated nitriles such as (meth)acrylonitrile; unsaturated amides such as (meth)acrylamide; olefins such as ethylene or propylene; a β-unsaturated aliphatic monomer such as halogenated vinyl chloride or vinylidene chloride; a β-unsaturated aromatic monomer such as styrene or methylstyrene, and the like, may be used, and these may be used either alone or as a combination of two or more types.

More preferably, the polyester acryl-based resin of the present invention may include two or more types of acryl-based monomers, and most preferably include an alkyl (meth)acrylate monomer or an epoxy (meth)acrylate monomer such as glycidyl (meth)acrylate.

Meanwhile, the polyester acryl-based resin may have the polyester glycol and the acryl-based monomer in a weight ratio of, but not limited to, approximately 1:9 to 9:1 in the reactant, more preferably approximately 2:8 to 8:2, and most preferably approximately 3:7 to 7:3. When the content of the polyester glycol and the acrylic monomer satisfies the above range in the reactant, properties such as adhesion with a functional coating layer and solvent resistance are excellent.

Next, the first primer layer and the second primer layer include water-dispersible fine particles as necessary. The water-dispersible fine particles capable of being used in the present invention may use any suitable fine particle, and examples thereof include inorganic-based fine particles, organic-based fine particles or a combination thereof. Examples of the inorganic-based fine particles may include inorganic oxides including silica-based, titania-based, alumina-based, zirconia-based, antimony-based and the like. Examples of the organic-based fine particles include a silicone-based resin, a fluorine-based resin, a (meth)acryl-based resin, cross-linked polyvinyl alcohol, a melamine-based resin and the like.

Silica is particularly preferable among the water-dispersible fine particles. Silica has more excellent blocking inhibition ability and has excellent transparency thereby does not produce haze, and there is no coloration as well, and accordingly, influences on the optical properties of a polarizing plate are smaller. In addition, colloidal silica has favorable dispersibility and dispersion stability for a primer composition, therefore, workability is more superior when forming a primer layer.

Meanwhile, the water-dispersible fine particles preferably has an average diameter (average first particle diameter) of approximately 10 to 200 nm, and more preferably approximately 20 to 150 nm. When the average diameter of the water-dispersible fine particles is less than 10 nm, surface energy increases causing aggregation and precipitation of the water-dispersible particles in a primer solution, which may lead to the decline of solution stability, and when the average diameter is greater than 200 nm, the water-dispersible particles are not uniformly dispersed in the primer solution causing particle aggregation, and the size becomes greater than visible light (400 nm to 800 nm) wavelengths scattering light having a wavelength of 400 nm or greater, and as a result, haze increases. By using fine particles having a particle diameter described above, unevenness is properly formed on the primer layer surface, therefore, friction at the contact surface between the acryl-based film and the primer layer, and/or between the primer layers may be effectively reduced. As a result, blocking inhibition ability may be more superior.

The primer composition of the present invention is water-based, therefore, the fine particles are mixed as water dispersion. Specifically, when silica is employed as the fine particles, the silica is preferably mixed as colloidal silica. As the colloidal silica, commercially available products in the art may be used as they are, and examples thereof may include SNOWTEX series manufactured by Nissan Chemical Industries, Ltd., AEROSIL series manufactured by Air Products, EPOSTAR series and SOLIOSTAR RA series manufactured by Nippon Shokubai Co. Ltd., LSH series manufactured by Ranco, and the like.

Next, the first primer layer and/or the second primer layer may further include a cross-linking agent as necessary. The types of the cross-linking agent capable of being used are not particularly limited, and various cross-linking agents used in the art, for example, oxazoline-based cross-linking agents, aziridine-based cross-linking agents, carbodiimide-based cross-linking agents and the like may be used without limit. Particularly, when the cross-linking agent is included in the first primer layer, there is an advantage in that adhesive strength with an adhesive layer is enhanced since water resistance and solvent resistance are improved. When the cross-linking agent is included, the content is different depending on the types of the cross-linking agent and the resin types of the primer layer, however, generally, the content may be approximately 0.01 parts by weight to 20 parts by weight, preferably approximately 0.1 parts by weight to 10 parts by weight, and more preferably approximately 0.3 parts by weight to 8 parts by weight, with respect to 100 parts by weight of the primer composition.

Next, the acryl-based film of the present invention will be described.

The acryl-based film may have a single layer or have a structure in which two or more layers of films are laminated, and when the acryl-based film has a structure in which two or more layers of films are laminated, the laminated films may be formed with identical materials or different materials.

Meanwhile, in the present invention, the acryl-based film means a film having a resin including an acrylate-based unit and/or a methacrylate-based unit as a main component, and the concept includes a film having not only a homopolymer resin formed with an acrylate-based unit or a methacrylate-based unit but also a copolymer resin copolymerizing other monomer units in addition to an acrylate-based unit and/or a methacrylate-based unit as a main component, and also includes a film formed by a blend resin blending other resins to an acrylic resin such as above.

Herein, examples of the acryl-based film may include a film including a copolymer having an alkyl (meth)acrylate-based unit and a styrene-based unit; and an aromatic-based resin having a carbonate part in the main chain, a film including an alkyl (meth)acrylate-based unit and at least one 3 to 6 membered-heteroring unit substituted with a carbonyl group, or a film including an alkyl (meth)acrylate-based unit, a styrene-based unit, at least one 3 to 6 membered-heteroring unit substituted with a carbonyl group, and a vinyl cyanide unit. In addition, an acryl-based film having a lactone structure may be included.

A monomer unit capable of being copolymerized to the acryl-based resin may include an aromatic vinyl-based unit, a 3 to 6-membered heteroring unit substituted with a carbonyl group, an acrylic acid unit, a glycidyl unit and the like. Herein, the aromatic vinyl-based unit refers to, for example, a unit derived from styrene, α-methylstyrene and the like, and the 3 to 6-membered heteroring unit substituted with a carbonyl group refers to, for example, a unit derived from a lactone ring, glutaric anhydride, glutarimide, maleimide, maleic anhydride and the like.

For example, the acryl-based film may be a film including a copolymer including an alkyl(meth)acrylate-based unit and at least one 3-membered to 10-membered heteroring unit substituted with a carbonyl group. Herein, the 3-membered to 10-membered heteroring unit substituted with a carbonyl group may be a lactone ring, glutaric anhydride, glutarimide, maleic anhydride, maleimide and the like.

Another example of the acrylic film may include a film including a blend resin blending an aromatic resin having a carbonate unit in the main chain to an acrylic resin. Herein, examples of the aromatic resin having a carbonate unit in the main chain may include a polycarbonate resin, a phenoxy resin and the like.

A method for preparing the acryl-based resin film is not particularly limited, and for example, the acryl-based resin film may be prepared by preparing a thermoplastic resin composition by sufficiently mixing an acryl-based resin, other polymers, additives and the like using any suitable mixing method, and then molding the result to a film, or the acryl-based resin film may be prepared by preparing an acryl-based resin, other polymers, additives and the like as a separate solution, then forming a uniformly mixed solution by mixing the separately prepared solutions, and molding the result to a film.

The thermoplastic resin composition may be prepared by, for example, pre-blending the film raw materials using any suitable mixer such as an omni mixer, and then extrusion kneading the obtained mixture. In this case, the mixer used in the extrusion kneading is not particularly limited, and for example, any suitable mixer including an extruder such as a monoaxial extruder and a biaxial extruder, a pressurized kneader, and the like, may be used.

Examples of the film molding method may include any suitable film molding method such as a solution casting method, a melting extrusion method, a calendar method and an extrusion molding method. Among these film molding methods, a solution casting method and a melting extrusion method are preferable.

Examples of a solvent used in the solution casting method may include aromatic hydrocarbons such as benzene, toluene and xylene; aliphatic hydrocarbons such as cyclohexane and decaline; esters such as ethyl acetate and butyl acetate; ketones such as acetone, methylethyl ketone and methylisobutyl ketone; alcohols such as methanol, ethanol, isopropanol, butanol, isobutanol, methyl cellosolve, ethyl cellosolve and butyl cellosolve; ethers such as tetrahydrofuran and dioxane; halogenated hydrocarbons such as dichloromethane, chloroform and carbon tetrachloride; dimethylformamide; dimethyl sufoxide, and the like. These solvents may be used either alone or as a combination of two or more types.

Examples of a device used in the solution casting method may include a drum-type casting machine, a band-type casting machine, a spin coater and the like. Examples of the melting extrusion method may include a T die method, an inflation method and the like. The molding temperature is preferably 150° C. to 350° C., and more preferably 200° C. to 300° C.

When a film is molded using the T die method, the film having a roll shape may be obtained by mounting a T die at the front end of a known monoaxial extruder or a biaxial extruder, and winding the film extruded to a film shape. Herein, the film may be monoaxially oriented by applying orientation in the extrusion direction by properly adjusting the temperature of a winding roll. In addition the film may be simultaneous biaxially oriented, sequential biaxially oriented and the like by orienting the film in the perpendicular direction to the extrusion direction.

The acryl-based film may be any one of an unoriented film or an oriented film. When the acryl-based film is an oriented film, it may be either a monoaxially oriented film or a biaxially oriented film, and when the acryl-based film is a biaxially oriented film, it may be any one of a simultaneous biaxially oriented film or a sequential biaxially oriented film. Film performances are improved when the film is biaxially oriented since mechanical strength is improved. By mixing the acryl-based film with other thermoplastic resins, the increase in the phase difference may be suppressed even when the film is oriented and optical isotropy may be maintained.

The orientation temperature is preferably in a range near the glass transition temperature of a thermoplastic resin composition, which is a film raw material, and preferably in a range of (glass transition temperature −30° C.) to (glass transition temperature+100° C.), and more preferably in a range of (glass transition temperature −20° C.) to (glass transition temperature+80° C.). When the orientation temperature is less than (glass transition temperature −30° C.), there may be a problem in that sufficient degree of orientation may not be obtained. On the contrary, when the orientation temperature is greater than (glass transition temperature+100° C.), there may be a problem in that the flow of the resin composition occurs and stable orientation may not be carried out.

The degree of orientation defined by an area ratio is preferably 1.1 times to 25 times, and more preferably 1.3 times to 10 times. When the degree of orientation is less than 1.1 times, improvement in toughness, which accompanies orientation, may not be obtained. When the degree of orientation is greater than 25 times, as much effects as the increased degree of orientation may not be recognized.

The orientation rate is preferably, 10%/min to 20,000%/min in one direction, and more preferably 100%/min to 10,000%/min. When the orientation rate is less than 10%/min, there may be a problem in that manufacturing costs may increase since relatively a long period time is required for obtaining sufficient degree of orientation. When the orientation rate is greater than 20,000%/min, there may be a problem in that the oriented film may break.

Heat treatment (annealing) and the like may be carried out on the acryl-based film after orientation in order for stabilizing optical isotropy or mechanical properties of the film. Conditions for the heat treatment are not particularly limited, and any suitable condition known in the art may be employed.

The first primer layer is formed by coating the first primer composition on one surface of the acryl-based film, and the second primer layer is formed by coating the second primer composition on the opposite surface. Herein, the coating may be carried out using a method of applying the primer composition on a substrate film using methods well known in the art such as a bar coating method, a gravure coating method and a slot die coating method, and drying the result.

Meanwhile, the drying may be carried out through a convection oven and the like, but the method is not limited thereto, and the drying may be preferably carried out for 5 seconds to 5 minutes at a temperature of 70° C. to 150° C. Meanwhile, coating with the primer composition may be carried out either before or after the orientation of the acryl-based film, and coating with the primer composition before orientation has an advantage in that the primer composition may be dried and oriented simultaneously. The drying temperature is different depending on the steps of the coating, and for films completed with orientation, the drying may be carried out in a temperature range that does not exceed a glass transition temperature (Tg) of the film, and when orientation is included, the drying is simultaneously carried out with the orientation at the temperature of the orientation, and the drying is carried out in a temperature range that does not exceed a decomposition temperature (Td) of the film.

Meanwhile, the first primer layer of the present invention may have a thickness of approximately 50 nm to 2000 nm, preferably approximately 100 nm to 1000 nm, and more preferably approximately 100 nm to 500 nm. In addition, the second primer layer may have a thickness of approximately 50 nm to 2000 nm, preferably approximately 100 nm to 1000 nm, and more preferably approximately 200 nm to 800 nm. When the thicknesses of the first primer layer and the second primer layer satisfy the above range, adhesive strength with an adhesive layer and a functional coating layer is excellent, and a slip property is excellent.

Meanwhile, when necessary, surface treatment may be carried out on at least one surface of the acryl-based film before forming a primer layer in order for improving adhesive strength with the primer layer, and herein, the surface treatment method may include at least one selected from the group consisting of alkali treatment, corona treatment and plasma treatment. Particularly, when the optical film used in the present invention is an acryl-based film that does not include a lactone ring, carrying out the surface treatment is preferable.

Meanwhile, after the first primer layer and the second primer layer are formed on both surfaces of the acryl-based film as described above, a functional coating layer such as an anti-glare layer, a hard coating layer and an anti-reflection layer may be laminated on the top of the second primer layer. The water-dispersible resin included in the second primer layer of the present invention has excellent solvent resistance, therefore, even when a functional coating layer including an organic solvent is formed on the second primer layer, problems such as peel-off of the coating layer or damage on the surface of the acryl-based film do not occur.

Meanwhile, the functional coating layer may be formed to have various compositions depending on the functions to provide, and for example, may be formed by a composition for forming a functional coating layer including a binder resin, fine particles, a solvent and the like.

For example, in the present invention, the composition for forming the functional coating layer may use binder resins well known in the art such as an acryl-based binder resin as the binder resin.

The types of the acryl-based binder resin are not particularly limited, and those known in the art may be selected and used without particular limit. Examples of the acryl-based binder resin may include an acrylate monomer, an acrylate oligomer or a mixture thereof. Herein, the acrylate monomer or the acrylate oligomer preferably includes at least one or more acrylate functional groups capable of participating in the curing reaction.

The types of the acrylate monomer and the acrylate oligomer are not particularly limited, and those commonly used in the art may be selected and used without limit.

In addition, as the acrylate oligomer, a urethane acrylate oligomer, an epoxy acrylate oligomer, polyester acrylate, polyether acrylate or a mixture thereof and the like may be used. As the acrylate monomer, dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylolpropane ethoxy triacrylate, 1,6-hexanediol diacrylate, propoxylated glycerol triacrylate, tripropylene glycol diacrylate, ethylene glycol diacrylate or a mixture thereof, however, the acrylate monomer is not limited to these examples.

Meanwhile, the fine particles are not absolutely required to be included in the functional coating layer, and may be included or may not be included as necessary. As the fine particles, organic fine particles, inorganic fine particles or a mixture thereof may be used, and the content of the fine particles may be, although not limited thereto, approximately 0.1 parts by weight to 100 parts by weight with respect to 100 parts by weight of the binder resin. When the content of the fine particles satisfies the above range, there is an advantage in that sufficient unevenness is formed on the coating layer, and coatability becomes favorable.

In addition, the inorganic fine particles may use a single material selected from among silica, silicon particles, aluminum hydroxide, magnesium hydroxide, alumina, zirconia and titania, or two or more of these together.

The organic fine particles may use one or more selected from among polystyrene, polymethyl methacrylate, polymethyl acrylate, polyacrylate, polyacrylate-co-styrene, polymethyl acrylate-co-styrene, polymethyl methacrylate-co-styrene, polycarbonate, polyvinyl chloride, polybutylene terephthalate, polyethylene terephthalate, polyamide-based, polyimide-based, polysulfone, polyphenylene oxide, polyacetal, an epoxy resin, a phenol resin, a silicone resin, a melamine resin, benzoguanamine, polydivinylbenzene, polydivinylbenzene-co-styrene, polydivinylbenzene-co-acrylate, polydiallyl phthalate and a triallyl isocyanurate polymer, or a copolymer of two or more of these.

Meanwhile, the content of the solvent may be, although not limited thereto, approximately 50 parts by weight to 1000 parts by weight with respect to 100 parts by weight of the binder resin. When the content of the solvent satisfies the above range, the functional coating layer has excellent coatability, has excellent coating film strength, and is readily prepared to a thick film.

The types of the solvent capable of being used in the present invention are not particularly limited, and organic solvents are commonly used. For example, one or more types selected from the group consisting of $C_1$ to $C_6$ lower alcohols, acetates, ketones, cellosolves, dimethylformamide, tetrahydrofuran, propylene glycol monomethyl ether, toluene, and xylene may be used. Herein, the lower alcohols may be a material selected from among methanol, ethanol, isopropyl alcohol, butyl alcohol, isobutyl alcohol and diacetone alcohol, the acetates may be a material selected from among methyl acetate, ethyl acetate, isopropyl acetate, butyl acetate and cellosolve acetate, and the ketones may be a material selected from among methylethyl ketone, methylisobutyl ketone, acetyl acetone and acetone, however, the lower alcohols, the acetates and the ketones are not limited thereto.

Meanwhile, the composition for forming the functional coating layer according to the present invention may further include a UV curing initiator added for the purpose of curing through UV irradiation as necessary. The UV curing initiator may include a single material selected from among 1-hydroxy cyclohexylphenyl ketone, benzyldimethyl ketal, hydroxydimethyl acetophenone, benzoin, benzoin methyl ether, benzoin ethyl ether, benzoin isopropyl ether and benzoin butyl ether, or a mixture of two or more, but is not limited thereto.

The UV curing initiator is preferably added in 0.1 parts by weight to 10 parts by weight with respect to 100 parts by weight of the binder resin. When the content of the UV curing initiator satisfies the above range, sufficient curing may occur, and film strength of the film may be enhanced.

In addition, the composition for forming the functional coating layer according to the present invention may further include one or more types of additives selected from among a labeling agent, a wetting agent and an antifoaming agent as necessary. The additives may be added in 0.01 parts by weight to 10 parts by weight with respect to 100 parts by weight of the binder resin.

In the present invention, the thickness of the functional coating layer may be, although not limited thereto, approximately 1 μm to 30 μm, and preferably approximately 1 μm to 20 μm. When the thickness of the functional coating layer satisfies the above range, sufficient functional properties are obtained, and the occurrence of cracks and the like may be prevented.

Meanwhile, the functional coating layer may be formed using a method of applying the composition for forming the functional coating layer on the second primer layer, and then drying and/or curing the result, and herein, the application may be carried out using coating methods well known in the art such as wet coating such as a roll coating method, a bar coating method, a spray coating method, a dip coating method and a spin coating method. However, the application method is not limited thereto, and various other application methods used in the art may be used.

Meanwhile, the drying and/or curing may be carried out using a method of irradiating heat and/or light on the composition for forming the functional coating layer applied on the second primer layer, and the drying step and the curing step may be carried out consecutively or simultaneously. However, considering process convenience and the like, the curing step is more preferably carried out by the irradiation of light such as W.

Meanwhile, the curing condition may be properly adjusted depending on the mixing ratios or the components of the composition for forming the functional coating layer, and for example, the irradiation may be carried out with an amount of approximately 0.01 $J/cm^2$ to 2 $J/cm^2$ for 1 second to 10 minutes in the case of electron beam or ultraviolet curing. In the electron beam or ultraviolet curing, when the curing time satisfies the above range, the binder resin may be sufficiently cured, and therefore, mechanical properties such as wear resistance are excellent and durability of the acryl-based film may be improved.

Meanwhile, in the present invention, the functional coating layer may be formed in a monolayer structure, or in a multilayer structure of two or more layers.

Such an acryl-based film described above may be favorably used as a protective film for a polarizing plate. More specifically, the present invention provides a polarizing plate including a polarizer; the acryl-based film of the present invention disposed on at least one surface of the polarizer; and an adhesive layer provided between the polarizer and the acryl-based film, and the first primer layer of the acryl-based film is disposed on the surface adjacent the adhesive layer.

Herein, polarizers generally used in the art may be used as the polarizer without limit. For example, as the polarizer of the present invention, polarizers prepared by dyeing, cross-linking and orienting dichroic dye and/or iodine and the like to a polyvinyl alcohol-based film, and the like, may be used.

Specific details of the acryl-based film are the same as those described above. In other words, it is an acryl-based film that includes a first primer layer including a water-dispersible polyurethane resin is formed on one surface, and a second primer layer including at least one or more types of a water-dispersible polyester-based resin, a water-dispersible acryl-based resin and a water-dispersible polyester acryl-based resin on the opposite surface, and specific details of the first primer layer and the second primer layer are the same as those described above, therefore, specific descriptions will not be repeated.

Next, the adhesive layer for attaching the polarizer and the acryl-based film may be formed with aqueous or non-aqueous adhesives generally used in the art, and for example, polyvinyl alcohol-based adhesives, acryl-based adhesives, epoxy-based adhesives, urethane-based adhesives and the like may be used without limit. Considering the adhesive strength with a polarizer, and the like, polyvinyl alcohol-based adhesives are preferable among these, modified polyvinyl alcohol adhesives including an acetoacetyl group are particularly preferable among these. Specific examples of the polyvinyl alcohol-based adhesive may include Gohsefiner Z-100, Z-200, Z-200H, Z-210, Z-220, Z-320 and the like manufactured by the Nippon Synthetic Chemical Industry Co., Ltd., but are not limited thereto.

Meanwhile, the non-aqueous adhesive is not particularly limited as long as it is radical-curable, and examples thereof may include an adhesive using a photoradical polymerization reaction such as a (meth)acrylate-based adhesive, an ene/thiol-based adhesive and an unsaturated polyester-based adhesive, an adhesive using a photocation polymerization reaction such as an epoxy-based adhesive, an oxetane-based adhesive, an epoxy/oxetane-based adhesive and a vinylether-based adhesive, and the like. Adhesion between a polarizer and a protective film layer using the non-aqueous adhesive may be carried out using a method of forming an adhesive layer by applying an adhesive composition, laminating the polarizer and the protective film, and then curing the adhesive composition through light irradiation.

Such a polarizing plate according to the present invention described above has excellent adhesive strength with an adhesive layer and a functional coating layer, and also has excellent slip and anti-blocking properties.

Furthermore, the optical film or the polarizing plate of the present invention may be favorably used for various image display devices such as liquid crystal display devices.

Hereinafter, the present invention will be described in more detail with reference to examples. However, the following examples are for illustrative purposes only, and the scope of the present invention is not limited to the following examples.

PREPARATION EXAMPLES 1 To 3

Second primer layer compositions A to C were prepared by mixing a water-dispersible resin, colloidal silica and water with the constitutions and the content listed in the following [Table 1].

TABLE 1

| Category | Water-dispersible Resin | | Fine Particle | | Water (g) |
|---|---|---|---|---|---|
| | Type | Content (g) | Type | Content (g) | |
| Preparation Example 1 | A CK-PAD (Solid 30%) | 53.3 | 100 nm (Solid 20%) | 4 | 42.7 |
| Preparation Example 2 | B A-645GH (Solid 30%) | 53.3 | 100 nm (Solid 20%) | 4 | 42.7 |
| Preparation Example 3 | C CK-PUD-1004A (Solid 30%) | 53.3 | 100 nm (Solid 20%) | 4 | 42.7 |

PREPARATION EXAMPLES 4 To 6

First primer layer compositions (1) to (3) were prepared by mixing a water-dispersible resin, colloidal silica and water with the constitutions and the content listed in the following [Table 2].

TABLE 2

| Category | Water-dispersible Resin | | Fine Particle | | Water (g) |
|---|---|---|---|---|---|
| | Type | Content (g) | Type | Content (g) | |
| Preparation Example 4 | (1) CK-PUD-1004A (solid 30%) | 23.3 | 100 nm (solid 20%) | 7.0 | 69.7 |
| Preparation Example 5 | (2) CK-PUD-PF (solid 30%) | 23.3 | 100 nm (solid 20%) | 7.0 | 69.7 |
| Preparation Example 6 | (3) CK-PAD (solid 30%) | 23.3 | 100 nm (solid 20%) | 7.0 | 69.7 |

Meanwhile, in [Table 1] and [Table 2], CK-PAD is a trade name of a polyester acryl-based resin sold by Chokwang Paint Ltd., A-645GH is a trade name of a polyester acryl-based resin sold by Takamatsu oil&fat Co. Ltd., CK-PUD-1004A is a trade name of a polyurethane-based resin sold by Chokwang Paint Ltd., and CK-PUD-PF is a trade name of a polyurethane-based resin sold by Chokwang Paint Ltd.

EXAMPLES 1 TO 4

After an unoriented film having a width of 800 mm was prepared with a poly(cyclohexylmaleimide-co-methyl methacrylate) (PMMA830HR manufactured by LG MMA) resin using a T-die film-forming apparatus under a condition of 250° C. and 250 rpm, the film was oriented by 1.8 times in an MD direction at a temperature of 135° C., and corona treatment was carried out on both surfaces of the pre-coated film under a condition of 50 W/m$^2$/min.

Next, a composition for a first primer layer was applied on one surface of the corona-treated acryl-based film, and then the result was dried for 1 minute at 90° C. On the opposite surface, a composition for a second primer layer was applied, and then the result was oriented in a TD direction at 135° C., and acryl-based films formed with the first primer layer and the second primer layer were prepared. Herein, the composition for the first primer layer and the composition for the second primer layer used were as shown in the following [Table 3]. In addition, the thickness of the first primer layer was 300 nm and the thickness of the second primer layer was 700 nm.

After that, an acryl-based UV-curable hard coating solution was applied on the second primer layer, the result was hot air dried for 2 minutes at a temperature of 60° C., and was UV cured, and as a result, an acryl-based film formed with a UV-curable hard coating layer was prepared.

Next, the hard coating-formed acrylic film/PVA element/acryl-based film were laminated in consecutive order so that the UV-curable hard coating layer is positioned on the exterior-most surface of a polarizing plate, an ultraviolet-curable adhesive was applied between each film, and then the result was passed through a laminator after setting the condition so that the adhesive layer has a final thickness of 1 to 2 μm. Then, a polarizing plate was prepared by irradiating ultraviolet light on the surface on which an acrylic film with no hard coating was laminated using a UV irradiator.

TABLE 3

| Category | First Primer Layer | Second Primer Layer |
|---|---|---|
| Example 1 | (1) | A |
| Example 2 | (1) | B |
| Example 3 | (2) | A |
| Example 4 | (2) | B |

COMPARATIVE EXAMPLE 1

A polarizing plate was prepared in the same manner as in Examples 1 to 4 except that an acryl-based film in which the first primer layer and the second primer layer were not formed was used.

COMPARATIVE EXAMPLE 2

A polarizing plate was prepared in the same manner as in Example 1 except that Composition C prepared in Preparation Example 3 was used as a composition for the second primer layer.

COMPARATIVE EXAMPLE 3

A polarizing plate was prepared in the same manner as in Example 1 except that an acryl-based film in which the first primer layer was formed on both surfaces of the acryl-based film was prepared by applying Composition (1) for the first primer layer prepared in Preparation Example 4 on the both surfaces.

COMPARATIVE EXAMPLE 4

A polarizing plate was prepared in the same manner as in Example 1 except that Composition (3) prepared in Preparation Example 6 was used as a composition for the first primer layer.

TEST EXAMPLE 1

Evaluation on Peel Strength of Polarizing Plate

Peel strength between the polarizer and the acrylic film of the polarizing plate prepared in Examples 1 to 4 and Comparative Examples 1 to 4 was measured. The peel-off experiments were carried out by measuring the peel strength at a speed of 300 m/min and 90 degrees using the polarizing plate having a width of 20 mm and a length of 100 mm. The results are shown in the following [Table 4]. The peel strength of greater than 2 N/cm was marked as OK, and 2 N/cm or less was marked as NG.

TEST EXAMPLE 2

Evaluation on Adhesion

After a 10×10 cut having a width of 1 mm was made in the UV-curable hard coating layer of the polarizing plate prepared in Examples 1 to 4 and a Comparative Examples 1 to 4, a tape was attached thereto, and then adhesion was evaluated by the degree of the coating layer being detached when the tape was removed. The number of the detached cells being 0 to 20 was evaluated as OK, and the number of the detached cells being 21 or greater was evaluated as NG. The results are shown in the following [Table 4].

TABLE 4

| Category | Peel Strength | Functional Coating Layer Adhesive Strength |
|---|---|---|
| Example 1 | OK | OK |
| Example 2 | OK | OK |
| Example 3 | OK | OK |
| Example 4 | OK | OK |
| Comparative Example 1 | NG | NG |
| Comparative Example 2 | OK | NG |
| Comparative Example 3 | OK | NG |
| Comparative Example 4 | NG | OK |

As shown in [Table 4], in the polarizing plate according to Examples 1 to 4, it was seen that the peel strength of the adhesive layer and the adhesive strength of the functional coating layer were both excellent, however, in the polarizing plate according to Comparative Examples 1 to 4, the peel strength of the adhesive layer and/or the adhesive strength of the functional coating layer were not favorable.

Hereinbefore, examples of the present invention have been described in detail, however, claims of the present invention are not limited thereto, and it will be apparent to those skilled in the art that various modifications and changes may be made without departing from the spirit of the present invention described in the claims.

The invention claimed is:
1. An optical film comprising:
an acryl-based film;
a first primer layer including a water-dispersible polyurethane resin formed on one surface of the acryl-based film; and
a second primer layer including at least one or more types of a water-dispersible polyester-based resin, a water-dispersible acryl-based resin and a water-dispersible polyester acryl-based resin formed on the other surface of the acryl-based film opposite to the first primer layer, wherein the second primer layer is a non-urethane-based primer layer.
2. The optical film of claim 1, wherein at least one of the first primer layer and the second primer layer includes water-dispersible fine particles.

3. The optical film of claim 1, wherein the water-dispersible polyurethane resin is carbonate-based polyurethane or ester-based polyurethane.

4. The optical film of claim 1, wherein the water-dispersible polyester-based resin includes a repeating unit represented by the following [Chemical Formula 1]:

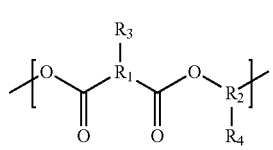

[Chemical Formula 1]

wherein, in [Chemical Formula 1], $R_1$ and $R_2$ are each independently, substituted or unsubstituted $C_{1-20}$ alkyl, substituted or unsubstituted $C_{6-20}$ aryl or substituted or unsubstituted $C_{5-20}$ cycloalkyl; and $R_3$ and $R_4$ are each independently hydrogen, substituted or unsubstituted $C_{1-20}$ alkyl, substituted or unsubstituted $C_{6-20}$ aryl, substituted or unsubstituted $C_{5-20}$ cycloalkyl, a carboxyl group, a hydroxyl group or a sulfonate group, and at least one of $R_3$ and $R_4$ is a carboxyl group, a hydroxyl group or a sulfonate group.

5. The optical film of claim 1, wherein the water-dispersible acryl-based resin includes a repeating unit represented by the following [Chemical Formula 3]:

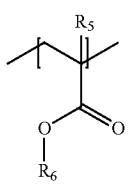

[Chemical Formula 3]

wherein, in [Chemical Formula 3], $R_5$ is hydrogen, or substituted or unsubstituted $C_{1-20}$ alkyl; and $R_6$ is hydrogen, substituted or unsubstituted $C_{1-20}$ alkyl, an epoxy group or a hydroxyl group.

6. The optical film of claim 1, wherein the water-dispersible polyester acryl-based resin includes an ester-based repeating unit represented by the following [Chemical Formula 1] and an acryl-based repeating unit represented by the following [Chemical Formula 3]:

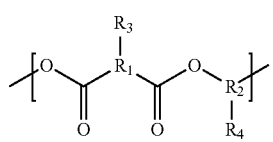

[Chemical Formula 1]

wherein, in [Chemical Formula 1], $R_1$ and $R_2$ are each independently, substituted or unsubstituted $C_{1-20}$ alkyl, substituted or unsubstituted $C_{6-20}$ aryl or substituted or unsubstituted $C_{5-20}$ cycloalkyl; and $R_3$ and $R_4$ are each independently hydrogen, substituted or unsubstituted $C_{1-20}$ alkyl, substituted or unsubstituted $C_{6-20}$ aryl, substituted or unsubstituted $C_{5-20}$ cycloalkyl, a carboxyl group, a hydroxyl group or a sulfonate group, and at least one of $R_3$ and $R_4$ is a carboxyl group, a hydroxyl group or a sulfonate group;

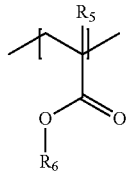

[Chemical Formula 3]

in [Chemical Formula 3], $R_5$ is hydrogen or substituted or unsubstituted $C_{1-20}$ alkyl; and $R_6$ is hydrogen, substituted or unsubstituted $C_{1-20}$ alkyl, an epoxy group or a hydroxyl group.

7. The optical film of claim 1, wherein the water-dispersible polyester acryl-based resin is prepared by reacting polyester glycol and an acryl-based monomer in a weight ratio of 1:9 to 9:1.

8. The optical film of claim 1, further comprising a functional coating layer on the second primer layer.

9. The optical film of claim 1, wherein the first primer layer is formed by a first primer composition including a polyurethane resin and water, and including the polyurethane resin in 1 to 30 parts by weight with respect to 100 parts by weight of the first primer composition.

10. The optical film of claim 9, wherein the first primer composition includes water-dispersible fine particles in 0 to 10 parts by weight with respect to 100 parts by weight of the first primer composition.

11. The optical film of claim 1, wherein the second primer layer is formed by a second primer composition including one or more types of water-dispersible resins selected from the group consisting of a water-dispersible polyester resin, a water-dispersible acrylic resin and a water-dispersible polyester acryl-based resin, and water, and including the water-dispersible resins in 1 to 50 parts by weight with respect to 100 parts by weight of the second primer composition.

12. The optical film of claim 11, wherein the second primer composition includes water-dispersible fine particles in 0 to 20 parts by weight with respect to 100 parts by weight of the second primer composition.

13. A polarizing plate comprising:

a polarizer;

the optical film of claim 1 disposed on at least one surface of the polarizer; and an adhesive layer provided between the polarizer and the optical film, wherein the first primer layer of the optical film is disposed on the surface adjacent the adhesive layer.

* * * * *